3,585,213
BENZODIOXOLE DERIVATIVES OF GUANIDINE
Darius Molho, Boulogne-sur-Seine, Eugene Boschetti, Venissieux, and Louis Fontaine, Lyon, France, assignors to Lipha, Lyonnaise Industrielle Pharmaceutique
No Drawing. Original application Feb. 21, 1967, Ser. No. 617,463, now Patent No. 3,502,695, dated Mar. 24, 1970. Divided and this application Oct. 29, 1969, Ser. No. 870,934
Claims priority, application France, Feb. 28, 1966, 51,313; Nov. 22, 1966, 84,498
Int. Cl. C07d 13/10
U.S. Cl. 260—340.5
10 Claims

ABSTRACT OF THE DISCLOSURE

The benzodioxole derivatives of guanidine of the formula

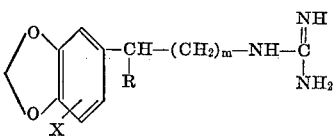

in which $m$ is equal to 0 or 1, X is a member of the group formed by hydrogen and bromine and R is a member of the group formed by hydrogen and the hydroxy radical, and their acid addition salts, useful as hypotensive agents.

---

This is a divisional application of S.N. 617,463, filed Feb. 21, 1967, now Pat. 3,502,695.

The present invention relates to new derivatives of guanidine, particularly heterocyclic compounds of guanidine, and also to the processes for the preparation thereof.

Certain derivatives of guanidine are known, these being particularly the [2-octahydro-1-azocinylethyl] guanidine sulphate, described by Maxwell and collaborators (Experentia, 15,267 (1959) and the (1,4-benzodioxan-2-yl) methyl guanidine sulphate, described by J. Augstein and collaborators (J. of the Medicinal Chemistry 8, 446, 1965). These derivatives have hypotensive properties.

The new compounds of the invention are formed by guanidine derivatives of amines of the noradrenaline type, of which the hydroxyl groups are blocked in a heterocyclic ring, such as the 1,3-dioxol ring.

They are represented by the formula

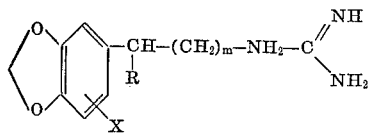

in which:

$m$ is equal to 0 or 1;

X is a member of the group formed by hydrogen and the halogens;

and R is a member of the group formed by hydrogen and the hydroxy radical.

These guanidines can be prepared according to the invention by one or other of the following methods, which enable them to be obtained with satisfactory yields.

According to the first method, an amine base of the general formula

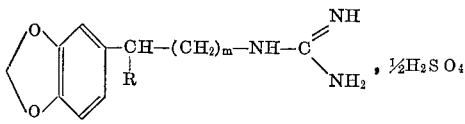

in which X, R and $m$ have the same meanings as above, is caused to react with a salt of S-alkyl isothiourea. The reaction preferably takes place under heat in a solvent.

According to the second method, the guanidines of the invention can be obtained by condensation of a salt of the above amine with cyanamide.

When X is a halogen in the general formula, it is possible to use a process which consists in halogenating a salt of a guanidine of formula.

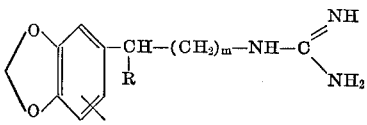

preferably in a solvent, such as acetic acid.

The guanidines in free form are easily prepared by treatment of the compounds, obtained by the preceding methods, with a concentrated alkali base, then the addition salts with the mineral and organic acids, starting with guanidines.

These addition salts are novel and as such form part of the invention.

The nitriles of the invention are obtained by dehydrating the corresponding aldoxime, itself synthesised by condensation of the formyl benzodioxane or benzodioxepine with hydroxylamine. According to one method of carrying out the invention, acetic anhydride is used as dehydrating agent. By reduction of the nitrile the expected amines are obtained with a very satisfactory yield. This reduction is preferably effected with lithium-aluminium hydride.

The 7 - (2' - amino-1'-ethanol)-3,4-dihydro-2H-benzodioxepine-1,5 can be obtained according to the invention by reduction, using the first method, of the cyanhydrin of 7-formyl-3,4-dihydro-2H-benzodioxepine-1,5 or, using the second method, of the 7-(2'-nitro-1'-ethanol)-3,4-dihydro-2-benzodioxepine-1,5.

The guanidines of the invention, and also their addition salts with mineral and organic acids, show remarkable hypotensive properties.

The activities of these compounds were determined by different methods. Tests were first of all carried out on an anesthetised rat, and the results of these tests are set out in columns 1, 2 and 3 of the following table. The arterial pressure was recorded on a rat, dormant with urethane, and the action of the product on the hypertensions obtained by intravenous injection of Noradrenaline and Tyramine were investigated. A first series of tests was carried out by administering the product intravenously (IV) and investigating its action on the hypertensions obtained with the pressor amines [Noradrenaline (Nor) et Tyramine (Tyr)], themselves administered one hour afterwards. In a second series of tests, the animals were pretreated with the products to be tested, the day before the test with the presser amines. These two tests permit the dissociation of the α-blocking effects visible in the first test (columns 1 and 2), in acute form, and the more lasting effects of the sympathoplegic type, visible with the pretreatment of the second test (column 3).

Tests were then carried out on an anesthetized cat, using the conventional connection of the nictitating membrane, and recorded before and after intravenous injection of the product to be studied, the contractions obtained by stimulation of the preganglionic fibre (column 4 of the following table) of the post-ganglionic fibre (column 5 of the table) and by injection of Adrenaline (column 6 of the table). The arterial pressure was simultaneously recorded.

The tests set out in the column 7 of the following table were carried out on an active cat, the products being administered subcutaneously to active cats. During the days following the administration, the possible relaxation of the nictitating membrane was noted and the fraction of the eye covered was determined.

The toxicities of the compounds tested, set out in column 8 of the table, are expressed by the 50% lethal dose (D.L. 50) in mg./kg. of the products administered intravenously to a mouse.

The following table summarises the results of these tests.

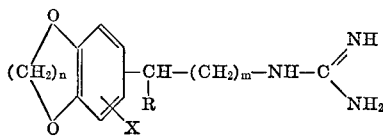

ministration to combat hypertension in invalids subject thereto. Dosages, ordinarily sufficient to effect the desired therapeutic result, range from about 10 mg. to about 500 mg. a day. These dosages are radialy supplied in accordance with usual medical regimen by the use of tablets, pills, encapsulations, aqueous suspensions, injectable solutions, syrups, elixirs and other suitable forms. An exemplary formulation of a tablet containing a dosage unit quantity is as follows:

| | Mg. |
|---|---|
| Active compound | 10 |
| Lactone | 79 |
| Cornstarch | 12 |
| Talc | 6 |
| Noyalgin | 6 |
| Starch (paste) | 6 |
| Magnesium stearate | 1 |

The guanidino-6-methyl-1,4-benzodioxane (particularly in its hemisulphate form) has a remarkable hypotensive activity, which was studied on human beings.

It was found that the guanidino-6-methyl-1,4-benzodioxane hemisulphate, in tablets each containing 20 mg. of active principle and an excipient, administerd perorally to invalids suffering from hypertension in a daily dose of 10 to 500 mg., preferably 20 to 40 mg. causes a regular lowering of the tension down to normal values. The administration of two tablets per day to invalids showing

| | Tests on the anaesthetized rat [1] | | | Tests on the anaesthetized cat (nictitating membrane), effects of product in I.V. on— | | | | DL 50 I.V. mouse, mg./kg. |
|---|---|---|---|---|---|---|---|---|
| Products | Product I.V. noradrenaline, percent of inhibition | 1 hour before tyramine, percent of inhibition | Product LR the previous day | Excitation of preganglio nio fibre | Excitation of postganglio nio fibre | Injected adrenaline | Test on active cat | |
| | 1 | 2 | 3 | 4 | 5 | 6 | 7 | 8 |
| R—OH:n—1:m—1 | 28 | 44 | Potentiation noradrenaline and tyramine. | Slight inhibition | Slight inhibition | No modification | Inactive | 33 |
| R—H:n—1:m—1 | 77 | 72 | Potentiation noradrenaline. | do | do | do | do | 16 |
| R—H:n—1:m—0 | 54 | 64 | do | Inhibition 100% | Inhibition 100% | do | Slightly active | 28 |
| R—H:n—1:X—Br (position 6). | 14 | 27 | Potentiation noradrenaline. | No modification | No modification | do | Inactive | 10 |
| R—H:n—2:m—0 | 55 | 65 | do | Inhibition 100% | Inhibition 100% | Potentiation | Active | 35 |
| R—H:n—2:m—1 | 9 | 0 | do | No modification | No modification | do | Inactive | 75 |
| R—H:n—3:m—0 | 13 | 29 | Potentiation noradrenaline and tyramine. | Inhibition 100% | Inhibition 100% | do | do | 17.5 |
| R—OH:n—3:m—1 | 0 | 5 | No action | No modification | No modification | No modification | do | 25 |
| Phentolamine (methane sulphonate). | 80 | 70 | | | | | | 100 |
| Guanethidine | ([2]) | 40 | Potentiation noradrenaline and tyramine. | Inhibition 100% | Inhibition 100% | Potentiation | Active | 20 |

[1] Modification of the hypertensive effects of noradrenaline and tyramine.
[2] Potentiation of 110%.

The reading of this table shows that, for the majority of the compounds according to the invention, there is more or less strong inhibition of the hypertensive effects of Noradrenaline and Tyramine in the acute test on the rat (columns 1 and 2). It is a question of a sympathicolytic effect on the same type as that of the products known under the name of phentolamine, [(N-p-tolyl-N-m-hydroxyphenylaminoethyl)-imidazoline methane sulphonate]. It will be observed that for certain products, there is superimposed on the preceding action a sympathoplegic action of the same type as that of the product known under the name of Guanethidine, [(2-octahydroazocinyl-1-ethyl)-guanidine sulphonate] with, in particular, inhibition of the contracting effects of the excitation of the preganglionic and post-ganglionic fibres, and, on the contrary, potentiation of the contracting effect of the injection of Adrenaline in the study of the nictitating membrane on the anesthetized rat.

The compounds of this invention are readily compounded into pharmaceutical forms suitable for convenient adarterial hypertensions such as maxima at 22, 24, 25 and minima at 14, 11, 15 on commencing treatment makes it possible, after a treatment lasting 5 to 6 days, to obtain a lowering of the hypertensions to maxima of 14 and minima of 10 to 11.

Examples which illustrate the invention are given below in non-limiting manner.

EXAMPLE 1

5-(2'-guanidino-1'-ethanol)-1,3-benzodioxole hemisulphate $C_{10}H_{13}N_3O_3$, $\frac{1}{2}H_2SO_4$

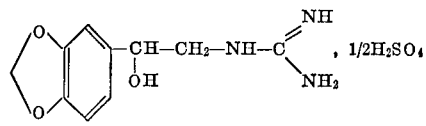

(a) β-hydroxy - β - methylene-3,4-dioxyphenyl ethylamine.—This compound is prepared by reduction of piperonyl cyanohydrin with lithium-aluminum hydride, according to N. Adityachaudhury (J. Ind. Chem. Soc., vol. 36, 1959, page 586). The starting product is itself obtained in accordance with the technique of F. A. Mason (J. Chem. Soc. London, vol. 119, page 1077).

The physical constants of the β-hydroxy-β-methylene-3,4-dioxyphenyl ethylamine which is prepared are as follows:

M.P.=75° C.
B.P. (0.07 millibar)=120–125° C.

(b) 5-(2′-guanidino-1′-ethanol)-1,3-benzodioxole hemisulphate.—To a solution of 1.66 g. (0.012 mol) of S-methyl isothiourea hemisulphate in 10 ml. of water, there are added 2.17 g. (0.012 mol) of β-hydroxy-β-methylene-3,4-dioxyphenyl ethylamine, prepared according to 1a, dissolved in 30 ml. of ethanol.

The mixture is heated under reflux for 4 hours, collecting the vapours of methyl mercaptan in a trap containing a solution of sodium hydroxide and hydrogen peroxide. After heating, crystallisation is allowed to take place at ambient temperature.

The 5-(2′-guanidino-1′-ethanol)-1,3-benzodioxole hemisulphate, after filtration by suction and recrystallisation from boiling water, melts at 219° C. (in a sealed tube). The yield is 1.4 g.

*Gravimetric analysis.*—Calculated (percent): C, 44.12; H, 5.15; N, 15.44. Found (percent): C, 44.56; H, 5.26; N, 15.04.

EXAMPLE 2

5-(2′-guanidino ethyl)-1,3-benzodioxole hemisulphate
$C_{10}H_{13}N_3O_2, \frac{1}{2}H_2SO_4$

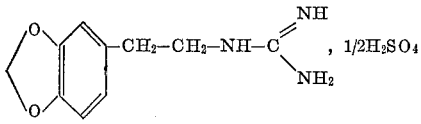

To a solution of 1.65 g. (0.012 mol) of S-methyl isothiourea hemisulphate in 10 ml. of water, there are added 1.98 g. (0.02 mol) of homopiperonylamine prepared according to Max Erne and Ramirez (Helv. Chim. Acta, vol. 33, 1950, page 914), dissolved in 20 ml. of ethanol. The mixture is heated under reflux for 4 hours, the escaping methyl mercaptan being trapped as before.

The solution is evaporated to dryness in vacuo and the residue obtained crystallises in ethanol.

It is recrystallised from boiling water, and after filtration by suction at ambient temperature, the 5-(2′-guanidinoethyl)-1,3-benzodioxole hemisulphate is obtained with a yield of 40% in the form of fine crystals melting at 182–183° C. (sealed tube). The concentration of the mother liquors permits the homopiperonylamine to be recovered.

*Gravimetric analysis.*—Calculated (percent): C, 46.87; H, 5.47; N, 16.41. Found (percent): C, 46.89; H, 5.67; N, 16.36.

EXAMPLE 3

Guanidino-5-methyl-1,3-benzodioxole hemisulphate
$C_9H_{11}N_3O_2, \frac{1}{2}H_2SO_4$

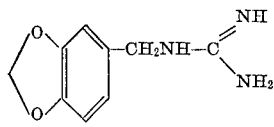

(a) Preparation of the piperonylamine.—The piperonylamine is prepared from piperonyl, by means of the oxime, which leads by dehydration to the corresponding nitrile, and the latter, by reduction with lithium-aluminium hydride, leads to the expected amine.

The piperonyl amine is obtained with a yield of 75% with respect to the initial nitrile. It has a boiling point of 86° C./0.6 millibar (Mannich, Berichte, vol. 45, page 318, after reduction with sodium amalgam, gives a boiling point of 188–189° C./13 millibars).

(b) Guanidino - 5 - methyl - 1,3 - benzodioxole hemisulphate.—In accordance with the conditions of Example 2, the mixture of 2.26 g. (0.015 mol) of piperonyl amine in solution in 30 ml. of ethanol and 2.08 g. (0.015 mol) of S-methyl isothiourea hemisulphate in solution in 10 ml. of water is heated under reflux for 4 hours.

From the solution, left at ambient temperature, a white crystalline compound is obtained which, after filtration by suction washing in alcohol and recrystallisation from water, melts at 242–243° C.

*Gravimetric analysis.*—$C_9H_{11}N_3O_2, \frac{1}{2}H_2SO_4$: Calculated (percent): C, 44.63; H, 4.99; N, 17.35. Found (percent): C, 44.81; H, 5.04; N, 17.25.

EXAMPLE 4

5-(2′-guanidino ethyl)-6-bromo-1,3-benzodioxole hydrobromide

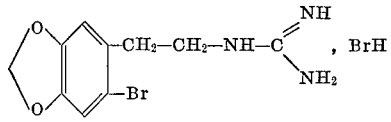

2 g. of 5-(2′guanidino ethyl)-1,3-benzodioxole sulphate (0.0078 mol), obtained according to Example 2, are solubilized at ambient temperature in 25 ml. of 80% acetic acid and this solution has added thereto, while stirring, 1.4 g. (0.0086 mol) of bromine in solution in 25 ml. of 80% acetic acid. On completing the addition, the mixture is placed for 3 hours on a water bath, this heating causing the release of hydrobromic acid.

Three quarters of the solvents are then evaporated in vacuo. The substance is filtered by suction and recrystallised from ethyl alcohol. The expected product crystallises as pinkish-white flakes melting at 21° C. (sealed tube), with a yield of 75%.

Gravimetric analysis.—$C_{10}H_{12}N_3O_2Br$, BrH: Calculated (percent): C, 32.73; H, 3.57; Br, 43.57; Found (percent): C, 32.71; H, 3.48; Br, 43.54.

EXAMPLE 5

Guanidino-6-methyl-1,4-benzodioxane hemisulphate

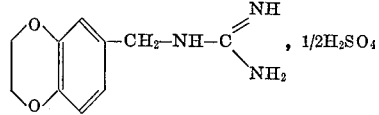

(a) Preparation of the amino-6-methyl-1,4-benzodioxane.—(a) 25 g. (0.152 mol) of 6-formyl-1,4-benzodioxane (Mp=50° C. Chem. Pharm. Bull. Tokyo, 1960, vol. 8, page 326) in 75 ml. of ethanol are placed in a spherical flask while stirring and a tepid solution of 12.8 g. (0.184 mol) of hydroxylamine hydrochloride in 16 ml. of water are added, stirring takes place for 5 minutes and then a solution of water is added. The flask is left while stirring and for 3 hours at the temperature of the laboratory. 80 g. of crushed ice are then introduced and the solution is saturated with carbon dioxide.

After standing overnight in a refrigerator, the aldoxime which has crystallised is filtered by suction washed with water and dried. The crude product melts at 62–63° C.; after drying, it is used as such for the remainder of the preparatory operations. The yield of crude product is 25 g., i.e. 91%. After crystallisation in water, the aldoxime is a white product melting at 69° C. (Kofler bench).

(b) The 25 g. of oxime in solution in 30 ml. of acetic anhydride are heated for 30 minutes under reflux. The solution is poured into 100 ml. of iced water, the 1,4-benzodioxane-6-nitrile precipitates, and this is separated by filtration by suction and then it is washed several times with iced water.

After recrystallisation from boiling water, this nitrile melts at 108° C. (Kofler bench). It has a boiling point of 114° C./0.55 millibar. The yield of nitrile is 77% with respect to the oxime.

*Gravimetric analysis.*—$C_9H_7NO_2$, mol. wt. 161.14: Calculated (percent): C, 67.10; H, 4.38; N, 8.69. Found (percent): C, 67.30; H, 4.43; N, 8.76.

16.1 g. (0.1 mol) of nitrile, obtained according to 5a (b), are dissolved in 750 ml. of ethanol. This solution is introduced at a temperature below 0° C. into a suspension of 4.5 g. of lithium-aluminium hydride in 180 ml. of anhydrous ether.

The ether is then brought under reflux for 3 hours on a water bath, whereafter there are successively introduced, while keeping the temperature at 0° C., 9 ml. of water, then 18 ml. of 20% sodium hydroxide and finally 30 ml. of water, these successive additions being made while stirring vigorously.

The stirring is continued while bringing the ether under reflux for 45 minutes. The hydroxides are then filtered by suction on fritted glass and washed several times with ether. The washing ether as well as the etherified solution are dried over $Na_2SO_4$. The ether is evaporated and the substance distilled in vacuo. The 6-aminomethyl-1,4-benzodioxane distils at 102–103° C./0.5 millibar, with a yield of 70%.

*Gravimetric analysis.*—$C_9H_{11}NO_2$, mol. wt.=165.16: Calculated (percent): C, 65.48; H, 6.70; N, 8.47. Found (percent): C, 65.39; H, 6.62; N, 8.43.

(b) Preparation of the guanidino-6-methyl-1,4-benzodioxane hemisulphate 13.9 g. (0.1 mol) of S-methyl isothiourea hemisulphate in solution in 30 ml. of water are placed in a spherical flask equipped with a stirrer device and reflux condenser. A solution of 16.5 g. (0.1 mol) of amino-6-methyl-1,4-benzodioxane in 200 ml. of ethanol is introduced.

Heating under reflux takes place for 4 hours and a strong release of methyl mercaptan is observed. The solution is concentrated to half under reduced pressure. A white precipitate is filtered by suction which, after crystallisation in boiling water and return to ambient temperature, crystallises in the form of fine white crystals melting at 205° C. (sealed tube).

The concentration to dryness of the reaction mother liquors gives a residue containing a little amino-6-methyl-1,4-benzodioxane sulphate, which is eliminated by being crystallised 3 times in boiling water, this leading to a second batch being obtained, which also melts at 205° C.

*Gravimetric analysis.*—$C_{10}H_{13}O_2N_3$, $\frac{1}{2}H_2SO_4$: Calculated (percent): C, 46.87; H, 5.51; N, 16.40; Found (percent): C, 46.77; H, 5.42; N, 16.25.

EXAMPLE 6

6-(2'-guanidino ethyl)-1,4-benzodioxane hemioxalate

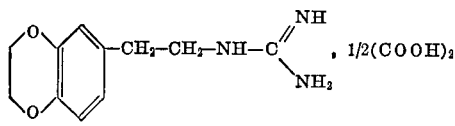

To 10.8 g. (0.06 mol) of 6-(2'-amine ethyl)-1,4-benzodioxane, BP.=101° C./0.3 millibar, prepared by the procedure described by Masao Zomita (Yakugaku Zasshi, 77, pages 2178–81, 1957) in solution in 100 ml. of ethanol, there is added a solution of 12.51 (0.09 mol) of S-methyl isothiourea hemisulphate in 50 ml. of water.

The mixture is heated under reflux for 4 hours, during which period a strong release of methyl mercaptan is observed, whereafter the solution is concentrated in vacuo until an oily residue is obtained. This is dissolved under heat ethanol and crystallisation is allowed to take place at ambient temperature.

The crude product is recrystallised twice from boiling water and treated in the following manner: it is dissolved in cold water and made alkaline with N/10 sodium hydroxide in order to displace the starting amine. Extraction is carried out by washing three times with chloroform and, after evaporation of the chloroform, the 6-amino ethyl-benzodioxane is identified in the hemisulphate state, melting at 208–210° C. in a sealed tube.

The aqueous solution, freed from the amine, is treated with 10% sodium hydroxide, this causing the precipitation of the 6-(2'-guanidino ethyl-1,4-benzodioxane in the form of a base. It is extracted three times with chloroform. After drying the chloroform extracts over $Na_2SO_4$, the solvent is evaporated on a water bath in vacuo and the basic compound is obtained in the form of an oil which is compound in acetone.

The base is then treated with a 10% solution of oxalic acid in acetone, this causing immediate dissolution of the base. The acetone is evaporated in vacuo; the residue is washed with ether in order to eliminate the excess of oxalic acid and the expected compound crystallises in a mixture of ether and absolute ethanol.

The 6-(2'-guanidino ethyl)-1,4-benzodioxane hemioxalate crystallises as fine crystals melting at 238–240° C. (sealed tube).

*Gravimetric analysis.*—$C_{11}H_{15}O_2N_3$, $\frac{1}{2}(COOH)_2$: Calculated (percent): C, 54.14; H, 6.06; N, 15.78. Found (percent): C, 54.02; H, 6.22; N, 15.57.

EXAMPLE 7

6-(2'-guanidino ethyl)-1,4-benzodioxane hemioxalate 0.91 g. (0.002 mol) of 6-(2'-aminoethyl)-benzodioxane sulphate and 0.25 g. (0.006 mol) of cyanamide are placed in a spherical flask with stirrer mechanism and suitable for heating on a metal water bath and the temperature is raised to 140–145° C. in 30 minutes the heating being maintained for 1 hour. The transparent resin which forms is washed with acetone and extracted by the procedure of Example 6, first of all with $N/10$ sodium hydroxide and then with 10% sodium hydroxide.

The substance is treated under the conditions of Example 6 with an oxalic acid solution and the expected compound is isolated in oxalate form, melting at 238–240° C. (sealed tube).

EXAMPLE 8

7-(guanidino methyl)-3,4-dihydro-2H-benzodioxepine-1,5 hemisulphate

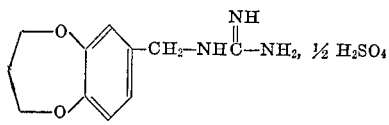

(a) Preparation of the 7-(aminomethyl)-3,4-dihydro-2H-benzodiazopine-1.5

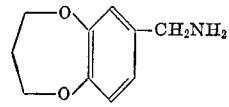

This amine is prepared from the corresponding 7-formyl, from which the aldoxime is made, then the nitrile, and reduction, of this nitrile.

17.8 g. (0.1 mil) of 7-formyl-3,4-dihydro-2H-benzodioxepine-1,5 (Masao Tomita-Yakugaku Zasshi 77, 1041–2-1957) are placed in solution in 50 ml. of ethanol. 8.4 g. (0.12 mol) of hydroxylamine hydrochloride in solution in water is introduced into this solution which is stirred for 5 minutes, and 6.05 g. (0.15 mol) of NaOH in solution in 10 ml. of water are added while cooling. The mixture is stirred for 3 hours at ambient temperature. A voluminous precipitate is obtained, into which is introduced 50 g. of ice and a stream of $CO_2$ for a period of 2 hours. The aldoxime is extracted with ether with a yield of 93%.

This compound is used in the crude state for the following operations.

18 g. of aldoxime are placed in solution in 30 ml. of acetic anhydride and refluxed for 30 minutes. After cooling, the solution is emptied on to 100 g. of crushed ice and the precipitate which forms is filtered by suction which precipitate, recrystallised from a mixture of benzene and hexane, melts at 82° C.

An analytic sample recrystallised from hot water is in the form of pearly platelets, melting at 86° C. (sealed tube).

The yield of 7-nitrile-3,4-dihydro-2H-benzodioxepine-1,5 is 10.5 g., i.e. 64.5%

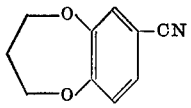

*Gravimetric analysis.*—$C_{10}H_9NO_2$—mol. wt.=175.18: Calculated (percent): C, 68.55; H, 5.17; N, 7.99. Found (percent): C, 68.68; H, 5.01; N, 7.82.

14 g. (0.08 mol) of this nitrile are placed in solution in 100 ml. of dioxane and introduced at 0° C. into a suspension of 3.8 g. (0.096 mol) of $AlLiH_4$ in 250 ml. of anhydrous ether.

After this addition, the mixture is stirred for 3 hours at 40° C. and then, after cooling on an ice bath, there are successively added 10 ml. of water, then 10 ml. of 20% NaCH, followed by 15 ml. of water. Heating then takes place for 1 hour at 40° C.

The precipitate is filtered by suction, the filtrate being evaporated and rectified. 56% of 7-(aminomethyl)-3,4-dihydro-2H-benzodioxepine-1,5 are obtained, the boiling point of which is 118–120° C./0.65 millibar.

The corresponding hydrochloride melts at 275° C (sealed tube) and is sublimed in the region of 215° C.

*Gravimetric analysis.*—For $C_{10}H_{13}NO_2$, HCl—mol. wt. =215.67: Calculated (percent): C, 55.68; H, 6.54; N, 6.49. Found (percent): C, 55.59; H, 6.43; N, 6.36.

(b) Preparation of the 7-(guanidino methyl)-3,4-dihydro-2H-benzedioxepine-1,5-hemisulphate.—3.6 g. (0.02 mol) of 7-aminomethyl-3,4-dihydro-2H-benzodioxepine-1,5 in solution in 30 ml. of ethanol are heated for 4 hours under reflux with 2.78 g. (0.02 mol) of S-methyl isothiourea hemisulphate in 15 ml. of water. The solution is then concentrated to half and, after cooling, the forming white crystals are filtered by suction and these, after being recrystallised twice from boiling water, give 2.3 g. of analytically pure compound, melting at 220–222° C. (sealed tube).

*Gravimetric analysis.*—For $C_{22}H_{32}N_6O_8S$—mol. wt.= 540.89: Calculated (percent): C, 48.89; H, 5.97; N, 15.54. Found (percent): C, 48.78; H, 6.14; N, 15.41.

EXAMPLE 9

7-(2'-guanidino ethyl)-2,4-dihydro-2H-benzodioxepine-1,5 hemisulphate

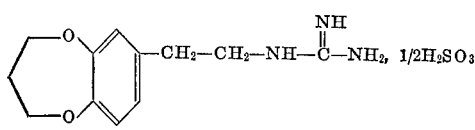

3.86 g. (0.02 mol) of 7-(2'-aminoethyl)-3,4-dihydro-2H-benzodioxepine-1,5 (Masao Tomita-Yakagaku Zasshi 77, 1041-2, 1957) (the author does not specify the boiling point found to be 128° C./0.6 millibar) in solution in 20 ml. of ethanol and 2.78 g. (0.02 mol) of S-methyl isothiourea in solution in 10 ml. of water, are refluxed for 4 hours.

After return to ambient temperature, a first batch crystallises (1.8 g.). After filtration by suction, the mother liquors have added thereto one volume of ethanol and then one volume of ether, these causing the precipitation of a second batch of 2.2 g. After being recrystallised twice from boiling water, 2.8 g. of brilliant flake are obtained which melt at 223° C. in a sealed tube (Gallen Kamp apparatus).

*Gravimetric analysis.*—For $C_{24}H_{36}N_6O_8S$—mol. wt. 568.64: Calculated (percent): C, 50.69; H, 6.38; N, 14.78. Found (percent): C, 50.84; H, 6.20; N, 14.64.

EXAMPLE 10

7-(2'-guanidino-1'-ethanol)-3,4-dihydro 2H benzodioxepine-1,5-hemisulphate

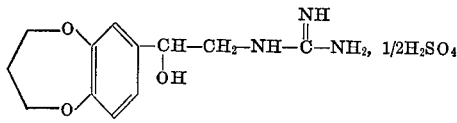

(a) Preparation of the 7-(2'-amino-1'-ethanol)-3,4 dihydro-2H-benzodioxepine-1,5.—First method: The cyanhydrin of the 7-formal-2,4-dihydro-2H-benzidiazepine-1,5, which will then be reduced, was prepared in the following manner:

Into 58.6 g. (0.19 mol) of bisulphitic salt of 7-formyl-3,4-dihydro-2H-benzodioxepine-1,5, dissolved in 110 ml. of water, there are introduced 55.9 g. (1.14 mol) of NaCN in solution in 115 cc. of water, while stirring and at a temperature of +5° C. After the addition, stirring is continued for 2 hours at this temperature and then for 1 hour at 25° C. The crude cyanhydrin extracted with the ether is obtained in the form of an orange oil with a yield of 89%.

Into 9.7 g. (0.24 mol) of $AlLiH_4$ and 340 ml. of anhydrous ether, there are introduced at 10° C. and in 45 minutes, 34.7 g., (0.17 mol) of previously obtained cyanhydrin in solution in 170 ml. of ether.

After stirring for 3 hours at ambient temperature, heating under reflux takes place for 4 hours. The substance is cooled and 34 ml. of water, 54 ml. of 20% sodium hydroxide and then 68 ml. of water are successively added, keeping the temperature at about 0° C.

The amine is extracted from this suspension with hot chloroform and, after drying, it is precipitated with hexane. The product obtained is filtered by suction, and is recrystallised from benzene. M.P.=130° C. Yield 12 g.

The boiling point of this amine is from 165–170° C./ 0.5 millibar.

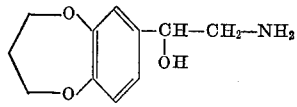

*Gravimetric analysis.*—For $C_{11}H_{15}NO_3$—mol. wt.— 209.24: Calculated (percent): C, 63.13; H, 7.25; N, 6.70. Found (percent): C, 63.03; H, 7.40; N, 6.72.

Second method: To 17.8 g. (0.01 mol) of 7-formyl-3,4-dihydro-2H-benzodioxepine-1,5, 15.25 g. (0.25 mol) of nitromethane and 400 ml. of methanol, there is added while stirring at −8° C. a solution of 2.3 g. (0.1 at./g.) of sodium in 80 ml. of anhydrous methanol.

Stirring takes place for another 5 minutes at −10° C. and the pH value is adjusted to about 5 with 18 g. of $CH_3COOH$. The substance is left standing for 5 hours at 0° C. and the solvents are evaporated in vacuo in order to obtain the 7-(2'-nitro-1'-ethanol)-3,4-dihydro-2H-benzodioxepine-1,5, which is taken up in ether, dried over $Na_2SO_4$, in order to give after evaporation of ether an oily compound which is reduced without purification with $AlLiH_4$, using the procedure of the first method.

After rectification, there is obtained the 7-aminoethanol-3,4-dihydro-2H-benzodioxepine-1,5, of which the melting point is 130° C. (benzene).

(b) Preparation of the 7-(2'-guanidino-1'-ethanol)-3,4-dihydro-2H-benzodioxepine - 1,5 hemisulphate.—4.18 g. (0.02 mol) of amine obtained according to (a) in solution in 42 ml. of ethanol and 2.78 g. (0.02 mol) of S-methyl isothiourea hemisulphate in 8 ml. of water are refluxed for 4 hours.

The solution is allowed to crystallise, after return to ambient temperature, into a compound which, after recrystallization form boiling water, melts at 230–232° C. (sealed tube).

*Gravimetric analysis.*—For $C_{24}H_{36}N_6O_{10}S$—mol. wt.= 600.62: Calculated (percent): C, 47.99; H, 6.04; N, 14.00. Found (percent): C, 48.07; H, 6.20; N, 13.88.

What we claim is:

1. A guanidine of the formula:

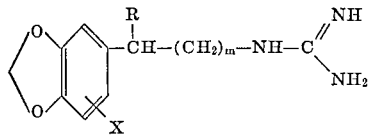

in which $m$ is equal to 0 or 1, R is a member of the group consisting of hydrogen and hydroxy and X is a member of the group consisting of hydrogen and bromine.

2. A non-toxic pharmaceutically acceptable acid addition salt of a guanidine as claimed in claim 1.

3. 5-(2-′-guanidino-1′-ethanol) - 1,3 - benzodioxole in accordance with claim 1.

4. 5 - (2′ - guanidino - 1′ - thyl) - 1,3 - benzodioxole in accordance with claim 1.

5. Guanidino - 5 - methyl - 1,3 - benzodioxole in accordance with claim 1.

6. 5 - (2′ - guanidino ethyl) - 6 - bromo - 1,3 - benzodioxole in accordance with claim 1.

7. 5 - (2′ - guanidino - 1′ - ethanol) - 1,3 - benzodioxole hemisulphate in accordance with claim 2.

8. 5 - (2′ - guanidino - 1′ - ethyl) - 1,3 - benzodioxole hemisulphate in accordance with claim 2.

9. Guanidino - 5 - methyl - 1,3-benzodioxole hemisulphate in accordance with claim 2.

10. 5 - (2′ - guanidino ethyl) - 6 - bromo - 1,3 - benzodioxole hydrobromide in accordance with claim 2.

References Cited

UNITED STATES PATENTS 3,247,221   4/1966   Augstein et al. ____ 260—340.3

ALEX MAZEL, Primary Examiner

J. H. TURNIPSEED, Assistant Examiner

U.S. Cl. X.R.

260—340.3

UNITED STATES PATENT OFFICE
CERTIFICATE OF CORRECTION

Patent No. 3,585,213                           Dated     June 15, 1971

Inventor(s)      Darius MOLHO et al.

It is certified that error appears in the above-identified patent and that said Letters Patent are hereby corrected as shown below:

Column 2, line 5, correct the formula as follows:

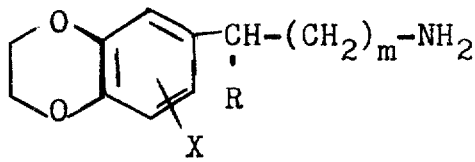

Column 5, line 37, change "1.65" to --1.66--

Column 8, line 45, in the formula, change "NHC" to -- N-HC--

Column 9, line 25, change "NaCH" to --NaOH--

Column 9, line 53, change "-2,4-dihydro-" to --3,4-dihydro- --

Signed and sealed this 30th day of November 1971.

(SEAL)
Attest:

EDWARD M. FLETCHER, JR.               ROBERT GOTTSCHALK
Attesting Officer                      Acting Commissioner of Patents